F. CRICK.
Carriage-Spring.
No. 57,094.
Patented Aug. 14, 1866.
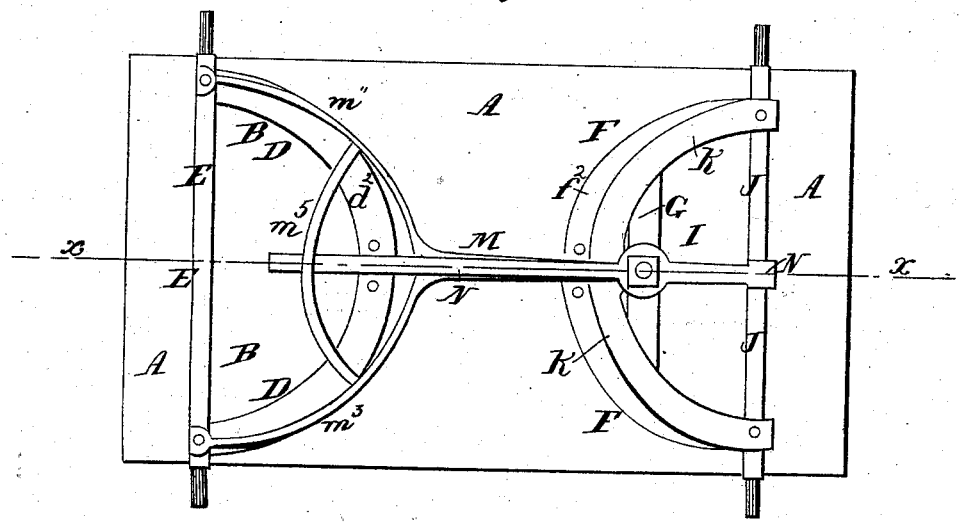
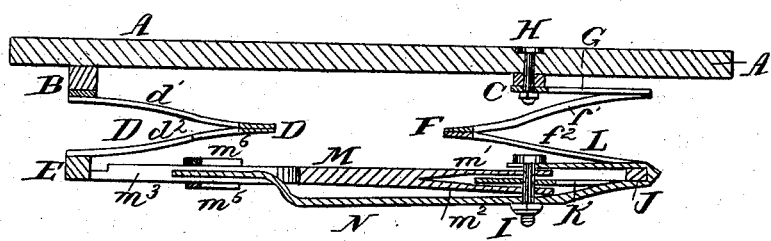

UNITED STATES PATENT OFFICE.

FRANCIS CRICK, OF BEAMSVILLE, OHIO.

IMPROVEMENT IN THE RUNNING-GEAR OF CARRIAGES.

Specification forming part of Letters Patent No. 57,094, dated August 14, 1866.

*To all whom it may concern:*

Be it known that I, FRANCIS CRICK, of Beamsville, in the county of Darke and State of Ohio, have invented a new and useful Improvement in Vehicles; and I do hereby declare that the following is a full, clear, and exact description thereof, which will enable others skilled in the art to make and use the same, reference being had to the accompanying drawings, forming part of this specification, in which—

Figure 1 is an under-side view of the body of a carriage with my improvement attached. Fig. 2 is a longitudinal section of the same taken through the line $x\ x$, Fig. 1.

Similar letters of reference indicate like parts.

My invention has for its object to furnish an improvement in the construction of the springs and gearing of vehicles which shall be strong, durable, and cheap; and it consists, first, in the springs, constructed and arranged as hereinafter described, in combination with the axles and body of the vehicle; second, in the gearing, constructed and arranged as hereinafter described, in combination with the axles of the vehicles.

A is the bottom of the carriage-body, across the under side of which, near the front and rear ends, are attached bars or bolsters B and C, to which the springs are connected.

To the ends of the rear bar, B, are attached, by bolts or rivets, the ends of the upper leaf, $d'$, of the semicircular or horseshoe spring D, the ends of the lower leaf, $d^2$, of which are attached by bolts or rivets to the rear axle, E, as shown in Fig. 2. The central parts of these springs are secured to each other by two bolts or rivets, as shown in Fig. 1.

The ends of the upper leaf, $f f'$, of the semicircular forward spring, F, instead of being attached directly to the forward bar, C, are bolted or riveted to the projecting arms of the curved bar G, the center of which is pivoted to the center of the bar or bolster C by a bolt, H, passing through the said bars G and C and the bottom A of the carriage, as shown in Fig. 2. This bolt H should be directly above the king-bolt I, for convenience in turning the vehicle.

The ends of the lower leaf, $f^2$, of the spring F are riveted or bolted to the forward axle, J, and the two leaves $f'$ and $f^2$ are securely connected to each other at their centers by two bolts or rivets, as shown in Fig. 1.

The springs D and F may be strengthened by one or more V-shaped springs, according as the uses to which the vehicle is to be applied may render necessary.

K is a curved or semicircular arm, the ends of which are attached to the under side of the axle J by the same bolts by which the ends of the leaf $f^2$ of the spring F are attached to the upper side of the said axle J.

To the forward or concave side of the arm K, at its center, is attached a projecting ear, through which the king-bolt I passes. The king-bolt I is further supported by the horizontal arm L, the forward end of which is bolted or riveted to the center of the axle J, and through its rear end passes the king-bolt, as shown.

M is the reach, the forward end of which is divided horizontally into two arms or branches, $m'$ and $m^2$, as shown in Fig. 2. One of these branches or ends passes above and the other below the circular arm K, and through them passes the king-bolt I. The rear end of the reach M is divided vertically into two arms, $m^3$ and $m^4$, which are curved, as shown in Fig. 1, and the ends of which are secured to the under side of the axle E by the same bolts or rivets that secure the ends of the leaf $d^2$ of the spring D to the upper side of the said axle E.

To the arms $m^3$ and $m^4$ of the reach M are attached two curved bars, $m^5$ and $m^6$, the one directly above the other, with a narrow space or channel between them.

N is a lever, the forward end of which is firmly attached to the under side of the center of the forward axle, J, the rear end of which works in the slot or channel between the bars $m^5$ and $m^6$ of the reach M, and through which passes the king-bolt I, as shown in Fig. 2. This lever is designed to act as a stop to prevent the carriage cramping too much in turning.

It should be observed that the ends of the curved bar K project in front of the forward axle, J, and upon them are formed ears, to which the eyes of the shaft or tongue irons are attached, thus requiring no clip to be used.

I claim as new and desire to secure by Letters Patent—

1. The semicircular or horseshoe springs D and F, constructed as described, in combination with the axles D and J, and with the body A of the carriage, substantially as described, and for the purpose set forth.

2. The gearing consisting of the reach M, the lever N, the circular arm K, the horizontal arm L, and king-bolt I, constructed and arranged as herein described, in combination with the axles E and J, substantially as described, and for the purpose set forth.

FRANCIS CRICK. [L. S.]

Witnesses:
 EDWARD FETTERY,
 DAVID BYERS.